(12) United States Patent
Balzer et al.

(10) Patent No.: US 11,694,254 B2
(45) Date of Patent: Jul. 4, 2023

(54) INTERACTIVE PHYSICAL PRODUCT BROWSING EXPERIENCE

(71) Applicant: Microsoft Technology Licensing, LLC, Redmond, WA (US)

(72) Inventors: Andreas Balzer, Dublin (IE); David Mowatt, Dublin (IE); Alan Noel Mulhall, Dublin (IE); Muiris Woulfe, Dublin (IE)

(73) Assignee: Microsoft Technology Licensing, LLC, Redmond, WA (US)

( * ) Notice: Subject to any disclaimer, the term of this patent is extended or adjusted under 35 U.S.C. 154(b) by 573 days.

(21) Appl. No.: 15/624,692

(22) Filed: Jun. 15, 2017

(65) Prior Publication Data

US 2018/0365759 A1 Dec. 20, 2018

(51) Int. Cl.
*G06Q 30/06* (2023.01)
*G06Q 30/0601* (2023.01)
*G06F 3/01* (2006.01)
*G06F 3/0482* (2013.01)
*G06F 3/04842* (2022.01)
*G06V 40/18* (2022.01)
*G06F 18/24* (2023.01)

(52) U.S. Cl.
CPC ......... *G06Q 30/0643* (2013.01); *G06F 3/013* (2013.01); *G06F 3/0482* (2013.01); *G06F 3/04842* (2013.01); *G06V 40/18* (2022.01); *G06F 18/24* (2023.01)

(58) Field of Classification Search
None
See application file for complete search history.

(56) References Cited

U.S. PATENT DOCUMENTS

| | | | |
|---|---|---|---|
| 5,595,264 A | 1/1997 | Trotta | |
| 5,933,814 A * | 8/1999 | Rosenberg | A47F 10/02 705/27.1 |
| 9,278,449 B1 * | 3/2016 | Linnell | B25J 9/1674 |
| 9,443,192 B1 * | 9/2016 | Cosic | G06N 3/02 |
| 9,720,934 B1 * | 8/2017 | Dube | G06V 10/42 |
| 2003/0154135 A1 * | 8/2003 | Covington | G06Q 30/00 705/26.8 |

(Continued)

OTHER PUBLICATIONS

Narayanan V, et al., "The Conceptual Design Model of an Automated Supermarket", In International Journal of Computer, Electrical, Automation, Control and Information Engineering vol. 8, No. 10, Oct. 3, 2014, pp. 1857-1862.

(Continued)

*Primary Examiner* — Fateh M Obaid
(74) *Attorney, Agent, or Firm* — Barta, Jones & Foley, PLLC

(57) ABSTRACT

The description relates to an interactive physical product browsing experience. One example includes a display system for displaying objects. The display system comprises a plurality of object displays each comprising an object store, a robot for moving objects to and from a repository, a user input receiving means, and a processing means. The processing means is configured to cause the object displays to display some of the objects, monitor user behaviour using the user input receiving means, and cause the robot to move an object from the repository to one of the object stores based on the user behaviour.

20 Claims, 12 Drawing Sheets

(56) References Cited

U.S. PATENT DOCUMENTS

| | | | |
|---|---|---|---|
| 2004/0086364 A1* | 5/2004 | Watanabe | B25J 19/021 414/416.01 |
| 2007/0156594 A1* | 7/2007 | McGucken | G06F 21/10 705/51 |
| 2007/0179867 A1* | 8/2007 | Glazer | G06Q 30/0603 705/26.43 |
| 2008/0027590 A1* | 1/2008 | Phillips | G05D 1/0088 701/2 |
| 2008/0086241 A1* | 4/2008 | Phillips | G05D 1/0038 701/2 |
| 2010/0004778 A1* | 1/2010 | Arimatsu | B25J 9/1697 700/214 |
| 2010/0087955 A1* | 4/2010 | Tsusaka | B25J 9/1676 700/245 |
| 2010/0185327 A1* | 7/2010 | Nakajima | G05D 1/0274 700/259 |
| 2011/0106339 A1* | 5/2011 | Phillips | G05D 1/0033 701/2 |
| 2012/0042280 A1 | 2/2012 | Hoffman | |
| 2012/0072023 A1* | 3/2012 | Ota | B25J 9/1671 700/259 |
| 2012/0310717 A1* | 12/2012 | Kankainen | G06Q 30/02 705/14.4 |
| 2013/0152511 A1* | 6/2013 | Derby | B65B 35/246 53/452 |
| 2013/0200644 A1* | 8/2013 | Shiomi | B25J 9/1612 294/207 |
| 2015/0142607 A1 | 5/2015 | Yang et al. | |
| 2015/0343635 A1* | 12/2015 | Linnell | B25J 9/1661 700/249 |
| 2016/0104175 A1 | 4/2016 | Fanourgiakis et al. | |
| 2018/0003932 A1* | 1/2018 | Keen | G01S 3/7864 |
| 2020/0005377 A1* | 1/2020 | Hashimoto | G06Q 10/08 |

OTHER PUBLICATIONS

"Automatic Shelving Systems | Automated Motorized Electronic Storage Racks", http://web.archive.org/web/20160812121726/http://www.southwestsolutions.com/high-density-file-shelving/automatic-shelving-systems-automated-motorized-electronic-storage-rack. Published on: Aug. 12, 2016, 8 pages.

Kumar, Swagat, "Robotics-as-a-Service: Transforming the Future of Retail", In White Paper of TATA, 2010, 3 pages.

Black, et al., "Pervasive Computing in the Supermarket: Designing a Context-Aware Shopping Trolley", In International Journal of Mobile Human Computer Interaction, vol. 2, Issue 3, 2010, 3 pages.

Daniels, Jeff, "Robots Move beyond Warehouses, Into Retail Stores", http://www.cnbc.com/2015/11/18/robots-move-beyond-warehouses-into-retail-stores.html, Published on: Nov. 18, 2015, 3 pages.

* cited by examiner

INTERACTIVE PHYSICAL PRODUCT BROWSING EXPERIENCE

BACKGROUND

Browsing physical products is a common activity in a range of scenarios. For example, customers in a hardware store may browse the shop front for a particular item they wish to buy. In the case of larger items such as furniture, a customer may be required to find the item they want in a warehouse by looking up a location using a product code or word search, and going to that location to retrieve the object from a set of warehouse shelves. Similarly, a factory worker may need to find a tool in a workshop by browsing an inventory of tools and materials, searching manually for the item they need. In all these situations, it is necessary to manually search through the physical items to find an item of interest.

This process is inherently inefficient and can be very slow and time-consuming, especially in the case of large inventories of objects. The need to know in advance what to search for places a burden on the user because the system is not inherently clever to identify what the user is likely to be looking for.

The embodiments described below are not limited to implementations which solve any or all of the disadvantages of these known techniques.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

The description relates to an interactive physical product browsing experience. One example includes a display system for displaying objects. The display system comprises a plurality of object displays each comprising an object store, a robot for moving objects to and from a repository, a user input receiving means, and a processing means. The processing means is configured to cause the object displays to display some of the objects, monitor user behaviour using the user input receiving means, and cause the robot to move an object from the repository to one of the object stores based on the user behaviour.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

The present disclosure presents a computing device, method and means for providing an interactive physical product browsing experience.

Typically, in order to browse physical objects and work out what is of interest, or where a specific object is located, a user has to browse a shop front, warehouse or other storage area and manually search. The inventors have appreciated that a more user-friendly approach is possible that makes use of an automated system for displaying and retrieving objects from a repository. This helps the user in at least two ways. Firstly, user behaviour can be monitored when displaying objects in order to determine what objects the user is likely to be interested in. Secondly, objects can be brought to the user from the repository, rather than the user having to go to the area where all the objects are stored. As will be described below, the inventors have developed an interactive browsing experience for browsing physical products. The system can be used for quickly working out what a user wants and bringing it to the user.

Figure 1:
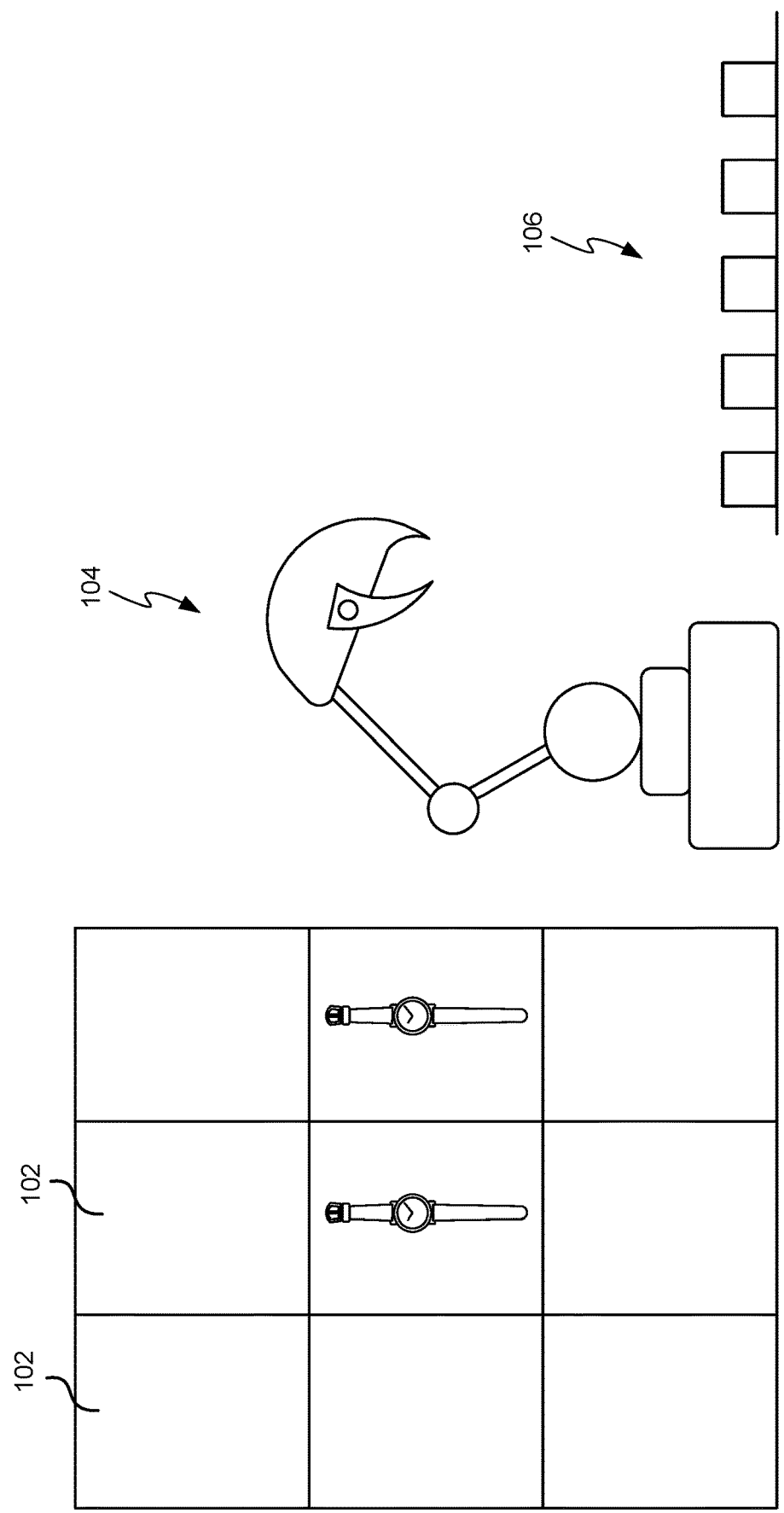
FIG. 1 is a schematic diagram of a display system for displaying objects to a user to provide an interactive physical product browsing experience.
Figure 2:
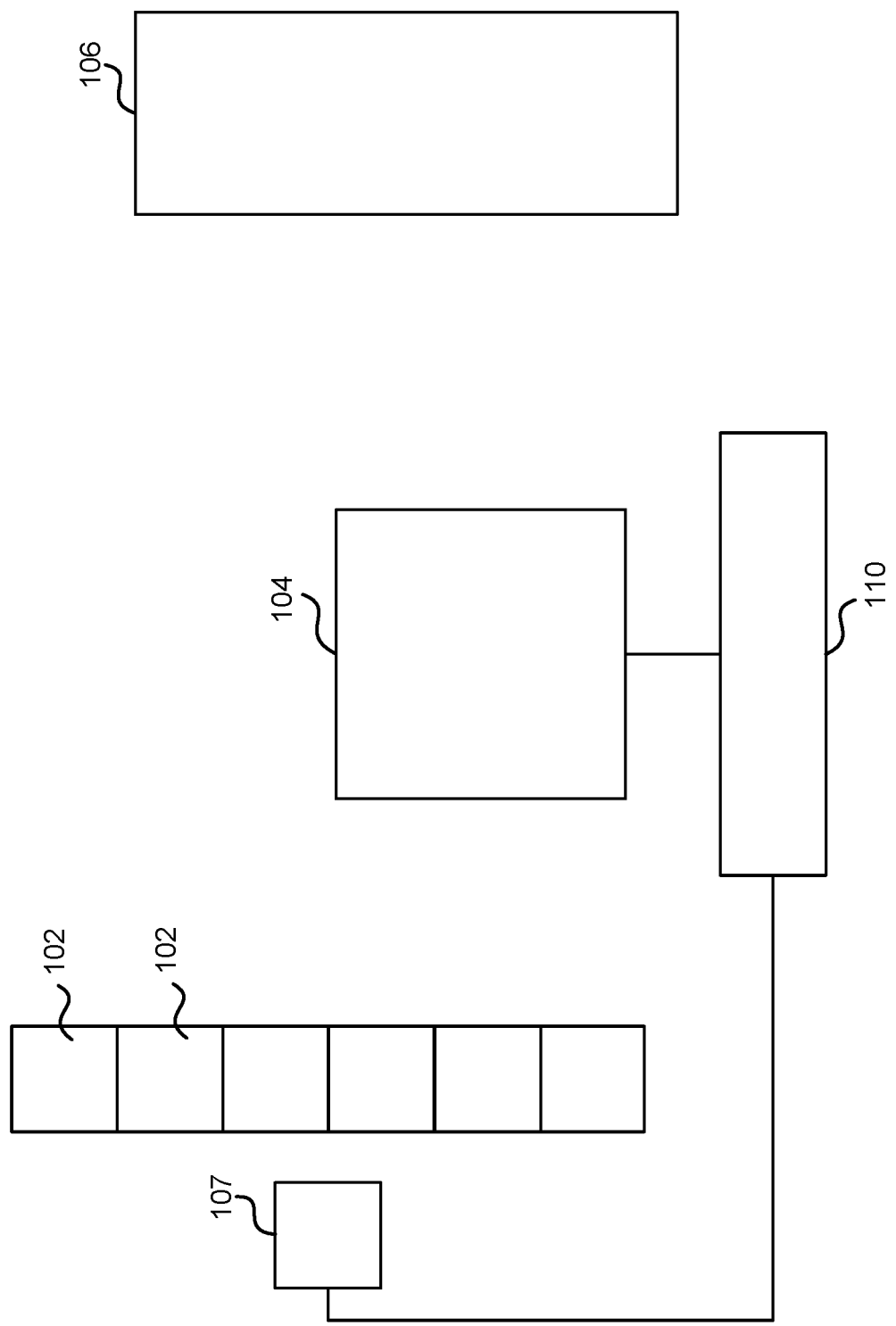
FIG. 2 is a block diagram of the above display system showing further elements and how they are connected.

Referring to FIGS. 1 and 2, an example display system may be configured for browsing an inventory of items which in the example shown are watches. The display system comprises a plurality of object displays 102, a robot 104 for moving objects to and from a repository 106, a user input receiving means 107, and a processing means 110. Each object display 102 comprises an object store in which an object from the repository 106 may be placed. The processing means 110 is configured to cause the object displays 102 to display some of the objects from the repository (i.e. a proper subset of the objects from the repository), monitor user behaviour using the user input receiving means 107, and cause the robot 104 to move an object from the repository 106 to one of the object stores based on the user behaviour.

Whilst FIG. 1 shows a single robot 104, a single set of object displays 102 and a single repository 106, in other examples, a set of object displays may share a set of robots and/or a set of repositories, where a set of robots comprises one or more robots and a set of repositories comprises one or more repositories.

In an example implementation, each object display 102 comprises a digital display device for rendering images and the objects are displayed by way of causing images of the objects to be rendered on the display screens. For example, each object display may comprise a liquid crystal display (LCD) facing the user which can be controlled by the processing means 110 to cause an object to be displayed by way of rendering one or more images or one or more videos of the object.

As indicated above, each object display 102 also comprises an object store. In this example, the object store may for example be provided as a small shelf or compartment provided behind, or even in front of or to the side of or otherwise adjacent, the digital display screen. The object store is configured to be able to accommodate an object, for example by having it placed on the shelf or in the compartment. In this example, it would be suitable for the processing means 110 to be configured to cause the robot 104 to move an object from the repository 106 to the object store of the object display 102 which displays it whenever the object display 102 renders an image of the object. Alternatively, the processing means 110 may be configured to cause the robot 104 to move an object from the repository 106 to the object store of the object display 102 which renders an image of it only if commanded to do so by the user. The user command may, for example, be a voice command, a pressed button, a touchscreen input, or any other suitable user input indicating a command to retrieve, for example, a selected object, all the displayed objects, or a selected subset of the displayed objects. In the second alternative, objects are only retrieved from the repository 106 upon the user's command, so the browsing experience can be faster until the point when the user is ready to be presented with one or more of the physical objects. On the other hand, in the first alternative the user does not need to wait so long to gain access to the physical object if it is displayed because it is already in the object store behind the digital screen.

In another example implementation, each object display 102 provides visibility of the contents of its object store and the objects are displayed by way of causing the robot to move them from the repository to the object store. For example, object stores may be implemented as a shelf or compartment for accommodating an object, in the same way as the previous example. In this case however, the object displays 102 may provide visibility of the contents of their object stores by comprising a transparent window or screen in front of the object store, or a frame in front of the object store. In another example, the visibility may be provided by the object display comprising only the object store.

Figure 3:
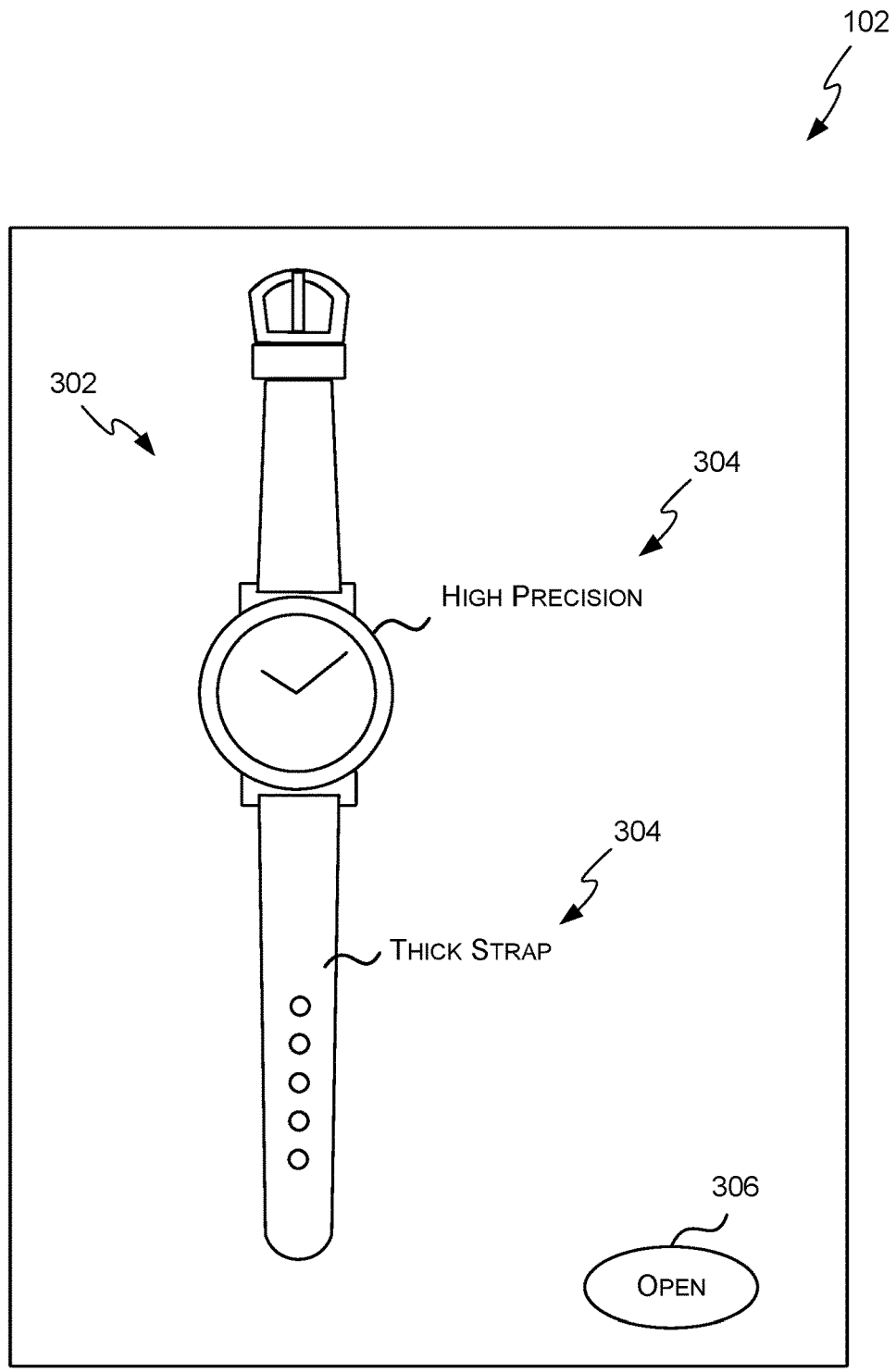
FIG. 3 is a schematic diagram of an object display of a display system.

In the case where the object display 102 comprises a transparent window or screen and an object store, the object display 102 may also comprise an LCD overlay over the transparent screen. For example, referring to FIG. 3, an object display 102 providing visibility of a watch 302 located in its object store may display further information 304 such as High Precision and Thick Strap about the watch 302. There may also be a prompt such as a touchscreen button 306 rendered to enable the user to open the object display 102 and take the watch 302 out.

In any of the above examples, there may also be provided an optional object cache for storing objects between the repository 106 and the object displays 102. This way, objects that are likely to be required from the repository 106 next can be requested from the repository 106 and kept on standby physically nearby to the object displays 102. This can be particularly helpful where the repository 106 houses a large stock of thousands of objects. Similarly, once an object has been in the object store and has been removed by the robot 104, it can be temporarily placed in the object cache instead of back in the repository 106 in case the user wants to go back to viewing the previous selection.

Figure 4:
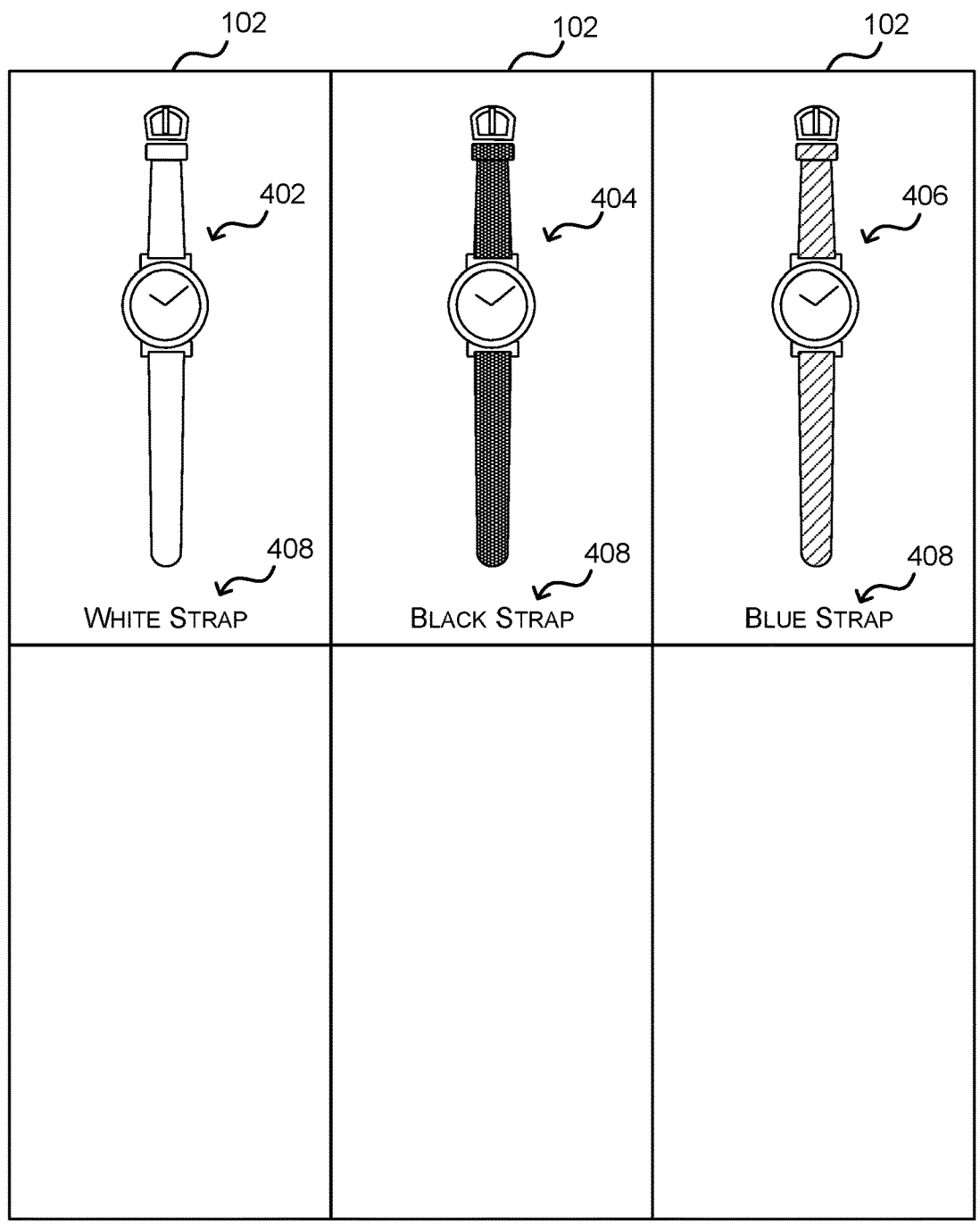
FIGS. 4-9 are schematic snapshots of a plurality of object displays of a further display system at subsequent times in a browsing experience.

Regardless of how the object displays 102 are implemented, or whether or not an object cache is provided, the processing means 110 may be configured to select objects to be displayed based on user behaviour. For example, referring to FIG. 4, an initial set of three object displays 102 may display watches with respective strap colours. From left to right, there is a watch 402 with a white strap, a watch 404 with a black strap, and a watch 406 with a blue strap. Indications 408 in words may also be displayed of the strap colours. For example, this may be implemented if the object displays 102 display the objects by rendering images of the objects, or may be implemented if the object displays 102 provide visibility of the objects themselves but have an LCD overlay for rendering additional information or buttons such as the indications 408. Other examples may exclude the indications 408.

Having seen the three watches 402, 404 and 406 with the different strap colours, the user may express an interest in one of the watches, for example the watch 404 with the black strap.

User interest is detected by the processing means 110 based on user behaviour using signals from the user input receiving means 107. The user input means 106 comprises one or more sensors and may detect various types of user input. For example, user interest in a displayed object may be determined based on selection of an object display 102 by touchscreen tap, keyboard input, gamepad input, other touch or button input, tilting or shaking a device measured using an accelerometer or gyroscope, gaze input, detection of hovering over a sensor, or detection of coming close to a sensor such as a proximity sensor. In some examples the display system enables scrolling through displayed objects. This may be most easily implemented in examples where the object displays 102 display objects by virtue of rendering images of the objects. In examples where scrolling is implemented, user interest in a displayed object may also be detected by a user scrolling towards an object. User interest and scrolling may also be implemented for example using scrollbars, pan gestures, voice commands, mouse clicks, keyboard inputs, digital pen or stylus inputs, touch inputs, eye tracking to determine gaze, and other gesture inputs for virtual reality or augmented reality environments. In examples where the object displays 102 display objects by virtue of providing visibility of the contents of their object stores, scrolling may be implemented in other ways. For example, the robot 104 may be configured to take out and put in objects to different object stores. In another example the object stores may comprise shelves connected to each other by a connecting band, such as a conveyor belt, and objects may be moved between the object stores using the connecting band to implement scrolling.

Figure 5:
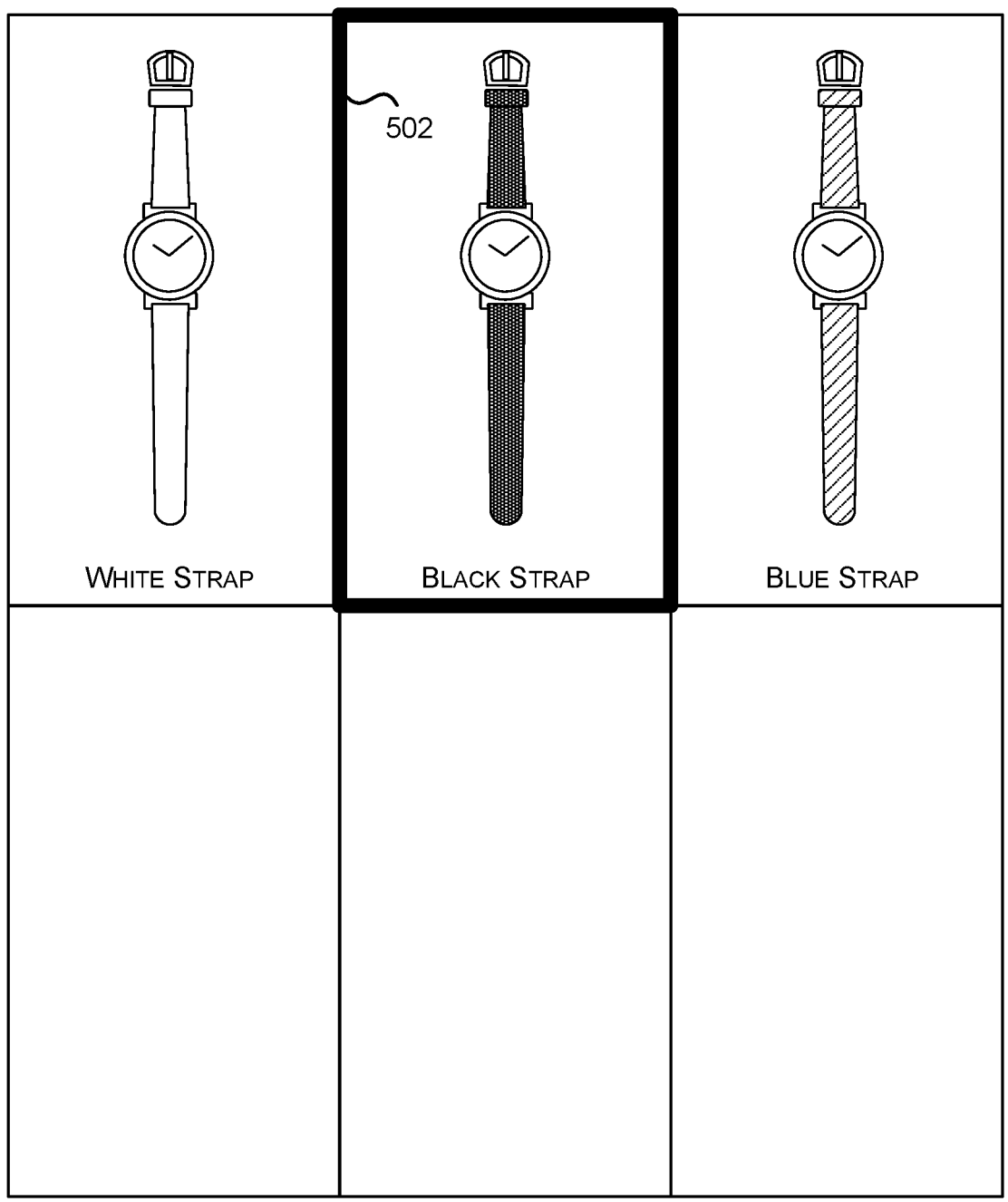

When user interest in the watch 404 with the black strap has been detected, the object display 102 displaying that watch may in some way highlight the watch, for example by illuminating the watch if visibility of the watch is provided, or by rendering an indication such as a thick border 502 as shown in FIG. 5. This can help indicate to the user that their interest in one of the displayed objects has been recognized and can help to convey the rationale with which further objects to be displayed are selected.

Figure 6:
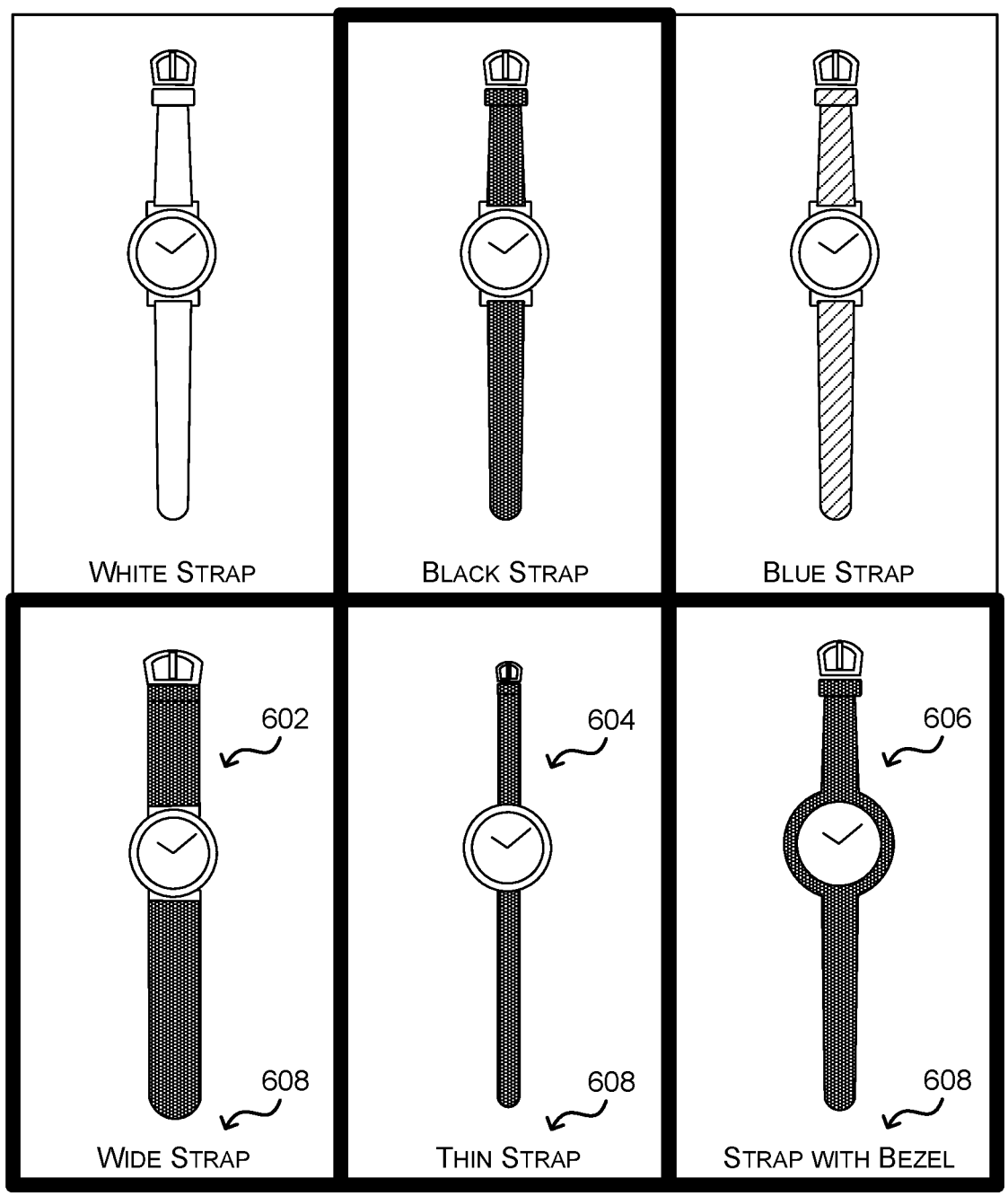
Figure 7:
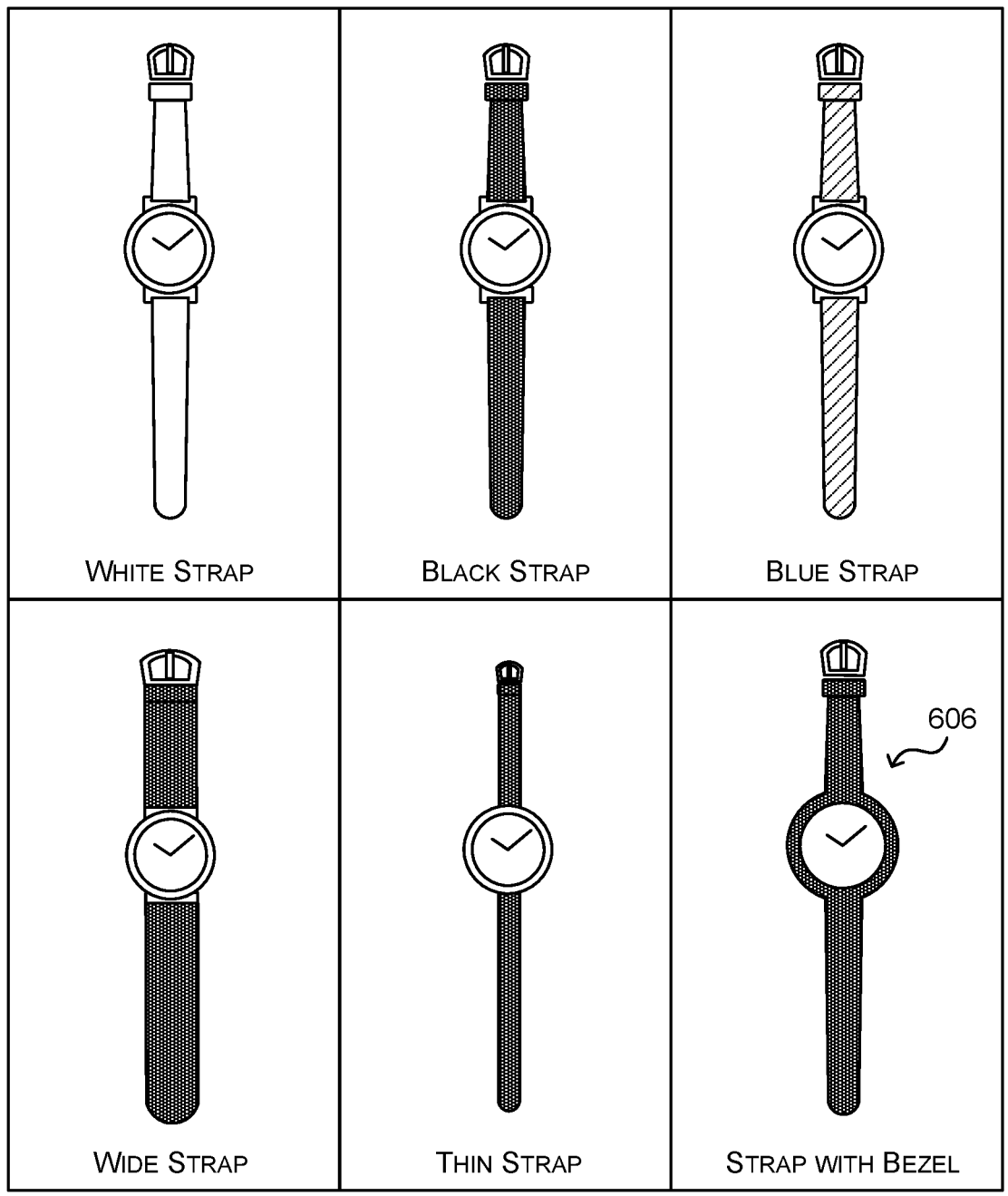

Having determined that the user is interested in the watch 404 with the black strap, the system may determine that more watches with black straps should be explored. This can be done in order to try to determine another feature of interest. For example, the system may determine that the strap shape should now be explored to test what shape the user is interested in. The system therefore displays further watches 602, 604 and 606, all of which have a black strap, but which vary in terms of the shape of the strap, as shown in FIG. 6. From left to right, the watch 602 has a wide strap, the watch 604 has a thin strap, and the watch 606 has a strap with a bezel. Indications 608 in words may be displayed of the strap shapes. A thick border may also be displayed to highlight each of the newly displayed watches 602, 604 and 606 so that all the watches with a black strap are highlighted to the user. This highlighting may be displayed temporarily, or not at all, as shown in FIG. 7.

Watches of different strap colours and strap shapes have now been introduced to the user. These classifications are used to build a set of features that the user is interested in, for example, black strap and strap with bezel. As such, the present disclosure presents a display system in which the processing means is configured to: associate a first plurality of objects with respective object displays, each of the first plurality of objects having a respective value of a first classification; cause each of the respective object displays associated with the first plurality of objects to display the object associated with it; receive from the user input receiving means a first user input indicating one of the first plurality of objects as a first object of interest, the first object of interest having a first value of the first classification; in response to receiving the first user input, associate a second plurality of objects with respective object displays, each of the second plurality of objects having a respective value of a second classification and being related to the first object of interest by having a value of the first classification within a threshold similarity of the first value; cause each of the respective object displays associated with the second plurality of objects to display the object associated with it. In the example above, the objects are watches, the first classification is watch strap colour, the first value is black strap, and the second classification is watch strap shape.

Figure 8:
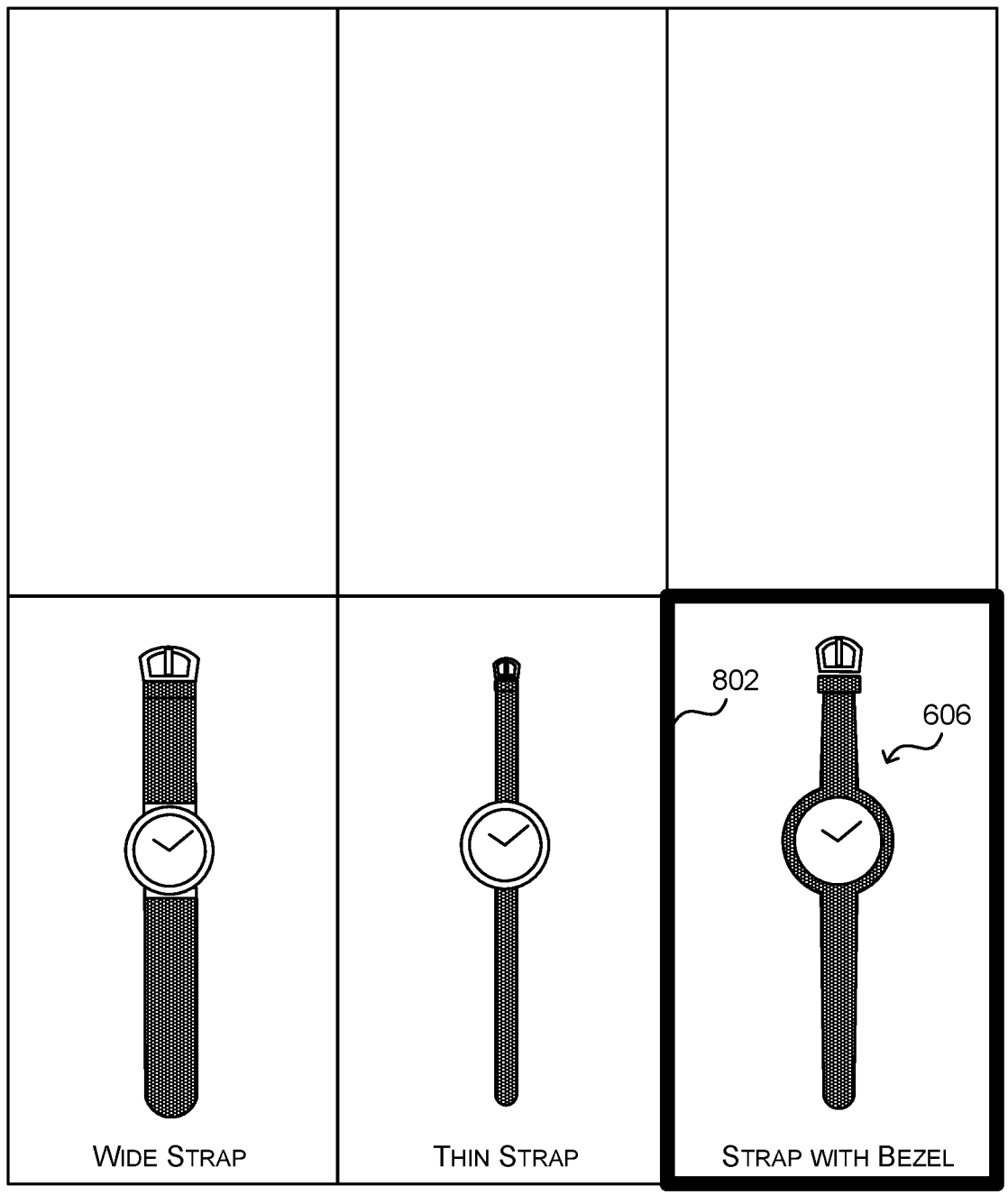
Figure 9:
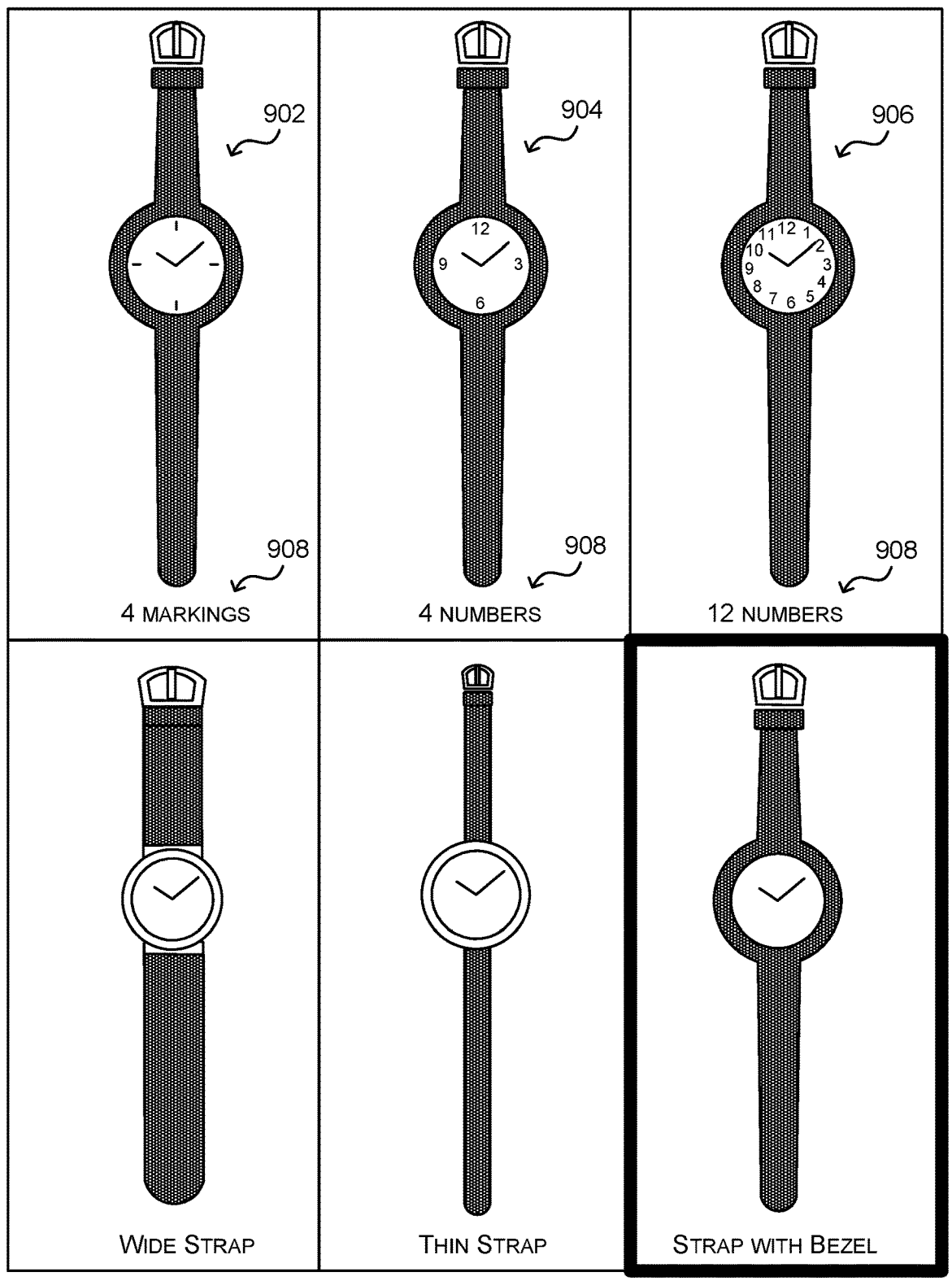

This approach may be used to help the user explore further classifications. For example, if the user expresses an interest in the watch 606 with the bezel strap, then this watch may be highlighted to the user, for example by displaying a thick border 802 as shown in FIG. 8. Some of the other object displays 602 that previously displayed watches may cease to display those previous watches, and may instead be populated by newly selected watches for exploring a further classification. For example, if the classification of the type of watch face is to be used, then those object displays may display watches with black, bezel straps that have different watch faces, as shown in FIG. 9. From left to right, a watch 902 has a watch face with four markings, a watch 904 has a watch face with four numbers, and a watch 906 has a watch face with twelve numbers. Indications 908 in words may also be displayed of the watch face types.

This approach may be continued to "drill down" to the exact watch with all the features that the user likes.

In addition to user behaviour, the system may use other factors to help determine which objects are to be displayed to the user. For example, the system may have or develop knowledge about an individual user and their preferences. By identifying the user, for example using facial recognition technology, the system may invoke a user profile in order to influence which objects are displayed to the user in order to try to increase the likelihood that the objects selected are of interest to the user. For example, if it is known from a user profile that a recognized user prefers a particular watch brand or strap colour, then these influences can be taken into account when determining which watches should be displayed. The profile may be built by using user preferences inferred from user selections. For example, in the case described above, the user may express an interest in watches with a black, bezel strap and a face with twelve numbers. Each time the user makes a selection (e.g. black from the displayed colours, or bezel from the displayed shapes), the selection can be logged in a user profile to inform future interactions with the recognized user. Accordingly, the display system may comprise a camera for imaging a user, and the processing means may be configured to use at least one image from the camera to identify the user and invoke a user profile associated with the user for determining objects in the repository to be displayed. Additionally or alternatively, the display system may comprise one or more other identifying means for identifying a user. For example, the display system may make use of a weight sensor, a digital form for the user to fill in, a near-field-communication (NFC) or Bluetooth signal from the user's smartphone, a camera to record a smartwatch animation identifying the user, or a means of receiving a personal identification number (PIN) code entered by the user. The application of user profiles is further described below.

The objects to be displayed may also be influenced based on an input object presented by the user. For example, if the display system services a repository of tools, then the user may present a drill in order to get the system to identify the drill and show matching or related tools, such as matching drill bits or alternative drills. Accordingly, the display system may comprise a camera for imaging an object presented by the user, and the processing means may be configured to use at least one image from the camera to identify associated objects in the repository to be displayed. A reference object of this kind could additionally or alternatively be identified by the display system in one or more other ways. For example, by using keyboard input for receiving a name or product number or code of the item entered by the user, or by receiving a speech input, scanned QR code or barcode input, or by receiving a radio frequency identification (RFID) input.

The user may wish to pick up a displayed object and interact with it, rather than just viewing it. This may help the user to confirm whether the object is of interest and whether it is something the user wishes to purchase. Accordingly, each object display 102 of the display system may be configured to provide user access to an object inside its object store to enable the user to remove the object from the object store and interact with it.

In implementations where the object displays 102 comprise a digital display for rendering images of the objects, the digital display may act as a window or door to the object store and access to an object inside the object store may be provided by opening the door. Access may be provided, for example, in response to a user command to open the door, for example tapping on a touchscreen button on the digital display for opening the door. Alternatively, the user command to open the door may be received by another input means, for example a sensor configured to detect a voice command. In other example implementations the door may have a handle and the user may be able to open the door by pulling on the handle. In this example the door may be configured to be locked until there is an object inside the associated object store. A similar arrangement may be provided in implementations where a transparent window provides visibility of the object, optionally with an LCD overlay as described above. In implementations where the object displays 102 do not comprise a window or door, and only comprise an object store such as a shelf or compartment, access to the object is straightforward because the user may simply reach for the object and pick it up. In this case and in the other cases, it may be suitable to tether the object to the object store in order to provide security while enabling the user to pick up and handle the object.

It some examples, each object display 102 comprises at least one sensor to identify an object returned to its object store by the user. This may facilitate security to ensure that the object has been returned. Alternatively or additionally, this arrangement may enable the system to move the object back to its correct place in the repository, thereby aiding tidying away after objects have been displayed.

Figure 10:
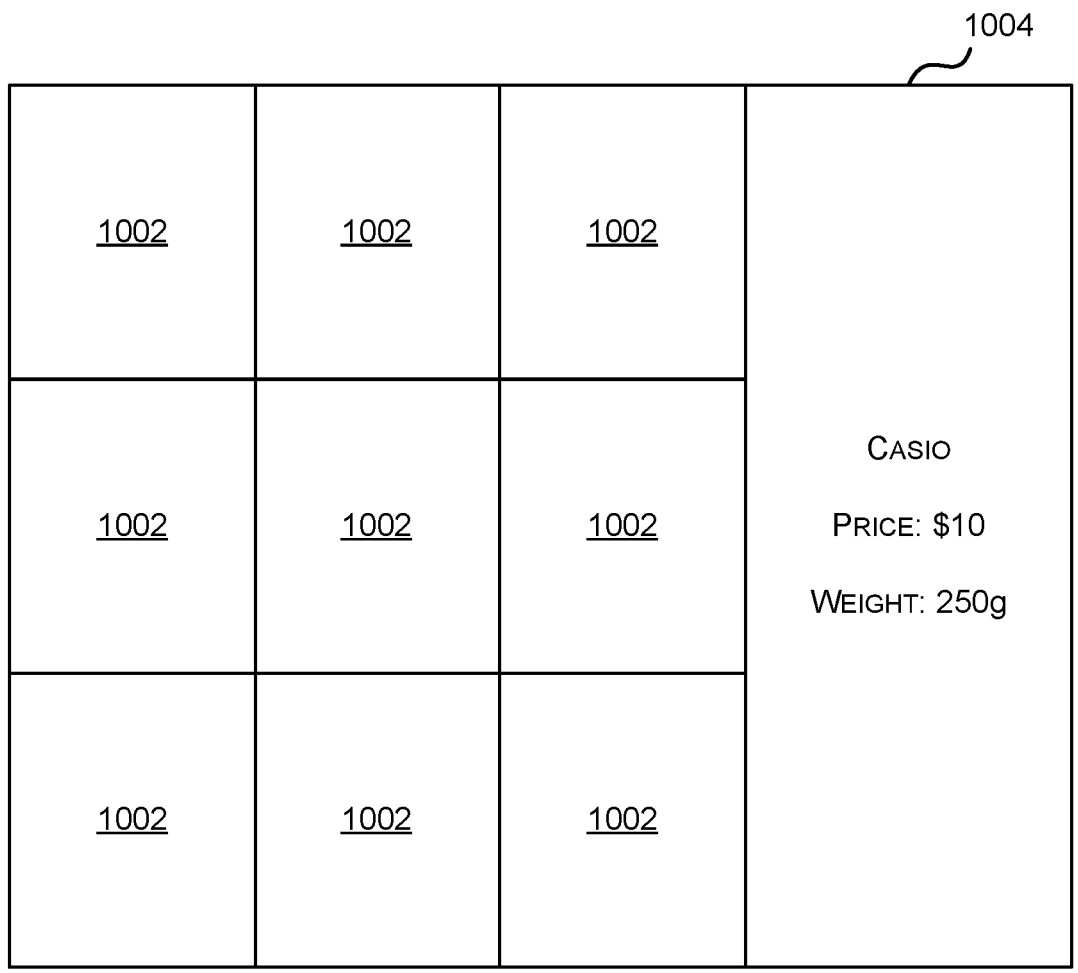
FIG. 10 is a schematic diagram of a yet further display system.

The display system may comprise a display screen for displaying details of an object of interest. Referring to FIG. 10, if a user expresses an interest in an object displayed in one of the object displays 1002, details of the object of interest may be rendered on the display screen 1004 such as brand, price and weight. This may further assist the user to confirm that the object is of interest.

The display system may also be configured to detect a transaction performed by a user in relation to an object that has been displayed. By tracking transactions such as purchases of known objects by known users, the system can determine whether the user was successful in finding an object of interest. This may be helpful in building a user profile, for example if it is determined that the classification of colour greatly helps a known user to find objects of interest. Alternatively, global trends may be detected, such as that the classification of price brackets used early in the process generally helps most users to find objects that they end up purchasing.

Detecting a transaction may comprise receiving a transaction complete signal identifying the object and the user from a transaction processing system. The transaction processing system may, for example, be configured for taking a payment using a contactless credit card or debit card in the user's possession. Alternatively, the transaction processing system may be configured to provide any refund required on the basis of a previously made upfront card or cash payment.

Additionally or alternatively, the display system may be configured to detect that a user has removed an object from an object store and not returned it within a predetermined period, and responsive to this to transmit a transaction trigger signal identifying the object and the user to a transaction processing system. In this arrangement, a transaction such as a payment may be completed automatically by the transaction processing system after receiving the transaction trigger signal indicating that the user has removed the object and not returned it. In another implementation, detection of removal of an object and failure to return the object to an object store within a predetermined time period may trigger a theft warning such as an alarm or a notification to a security service or the police.

The display system is suitable to be used in a range of applications. As indicated above, the system may be implemented for displaying watches in a retail environment or for displaying tools in a tool storage facility. In other applications, the system may be used to display drinks bottles such as wine bottles, furniture, items of clothing such as jackets and trousers, and a wide range of other applications in which a user needs to browse physical objects to identify an object of interest.

In some example implementations, there may be provided an additional assembly or manufacturing step based on or using objects retrieved from the repository, and taking place between the repository and the object displays. For example, the assembly or manufacturing step may comprise filling cups with drinks, mixing drinks and putting them into cups, baking bread on demand, boiling noodle soup, baking pizza, three-dimensional (3D) printing objects (in some examples instead of retrieving objects from a repository), printing documents, coloring objects by painting, working on metal, clothing production, and various other processing, assembly or manufacturing steps.

It will be appreciated that the order in which classifications such as watch strap colour and watch strap shape are used to drill down to what the user is interested in may affect the efficiency with which objects of interest can be determined. For example, in the above example of three classifications of watches, the following classifications in the following order are used.

Strap colour, strap shape, face type

However, it may be found that for most users price has a greater influence on finding a suitable watch than the above three classifications. For example, it may be that even if watches with suitable strap colours, strap shapes and face types are presented to the user, if they are all too expensive the user will not buy. In this case, it may be more likely to lead to a successful outcome such as a sale if price is used to filter the products earlier in the process. In this case, the following order of classifications may lead to more sales and a more efficient and effective determination of watches of interest to the user.

Price, strap colour, strap shape, face type

In general, classifications that are more important to the user should be presented earlier in the process. In some examples, this may be expressed by saying that classifications having a better ability to lead to a sale should be used first.

Other ways of assessing the suitability of a classification and how early it should be used include the ability of a classification to split up a set of objects. For example, if there are one hundred watches in the repository and only two are waterproof, then being waterproof is a sparse property for watches and the classification of whether the watches are waterproof does not split the set of objects well. In this case, being waterproof is not a high performing classification for determining which watches are of interest to the user. A diverse and reasonably evenly distributed classification is preferred which splits the objects into a reasonable number of comparably sized groups.

Another factor to consider is that some classifications may not support easy decision-making for the user between values of the classification. For example, it may be more difficult for the user to choose between strap fabrics than between colours. In this case, strap colour is a more effective classification and should be used before strap fabrics. The classification of strap colours can be said to enable the user to direct the search more easily than the classification of strap fabrics.

Each classification may be scored based on a set of performance criteria, such as:

Ability to split up the set of objects
Ability to enable the user to direct the search
Ability to lead to a sale These may be combined to give an overall score for each classification, and the classification with the overall score indicating best performance can be used first. The classifications may then be used in the order of their overall scores thereafter in the process of determining items of interest.

It would also be suitable for the user to be provided with input means such as buttons or drop down menus for manually selecting the classifications by which to search. In this case, it may be suitable to determine the user's favourite classifications and/or classification orders and to record these in a user profile and automatically bias towards using these classifications and classification orders in future searches.

When a classification such as strap colour or watch price has been chosen for presenting options to the user, it has also to be determined which values of that classification should be presented to the user. For example, if the classification of strap colour is to be used first in a search for watches, the question becomes which colour options to present to the user. If four values of colour are to be presented, should these be red, cream, blue and grey, or red, black, khaki and white, or another combination? In order to select the values of colour, or the values or value ranges of any classification, one or more of the following performance criteria may be considered.

Popularity among users

Most common in inventory of objects in the repository

Include one wildcard (e.g. to show a value of a different classification)

Bias towards user's known preferences stored in the user profile

Ability to enable the user to direct the search

Ability to lead to a sale

The skilled person will appreciate that there are various ways to define or measure some of the performance criteria. For example, the ability of a classification, value or value range to enable the user to direct the search can be measured by tracking user confusion or delays in user choice, for example based on eye tracking. If a user struggles to make a choice or picks three out of four objects, this indicates that the classification or values are not enabling the user to choose well. If a user cannot choose, a back button may be provided or another gesture such as a voice command of 'I can't choose' may be used by the user to instruct the system to abandon a set of values or value ranges or a classification, and attempt to provide the user with a different set of options. Furthermore, the ability of a classification, value or value range to lead to a sale or to enable the user to direct the search can be individualised to a user, based on global trends among all users, or both. Popularity among users may, for example, be inferred from information in social media networks.

Values may be discrete or continuous. For example, discrete values for a size classification may include small, medium and large. Continuous values for a clothing size classification may include ranges of waist sizes in centimetres or inches. Colour can be treated as text labels such as blue and red, or as continuous red-green-blue (RGB) values. Alternatively, colour options may be grouped in other ways, such as three categories of black, white and colourful. There may also be other textual classifications such as jacket type which may take values such as winter jacket, summer jacket, sports jacket and so on.

Finally, it must be determined which instances of a selected value of a selected classification are to be presented to the user. For example, if watches are first to be split by strap colour, and the four colours red, black, khaki and white are to be presented, then the question becomes which exact watches should be chosen. Instances may be selected based on a range of factors, including for example:

Most purchased among users (e.g. the most purchased red strap watch, the most purchased black strap watch, etc)

Bias towards a user's known preferences

In some examples, the classification, value or value ranges, and instances may be selected randomly or may be instructed by the user by voice or other command or gesture.

They may also be selected based on popularity by virtue of having been frequently selected by users in previous searches. Other selection criteria may also apply such as the ability to lead to the best profit margin. For example, if it is known that a competitor is selling a large volume of a particular item, then it may be suitable to bias towards the selection of values, value ranges or instances of items that are similar. Other influencers that may be used to contribute to the selection criteria may include seasonality, excess of stock, sales pricing, and the presence and nature of merchandizing deals.

The positioning of objects among the object displays 102 may also be affected by the objects' characteristics. For example, objects that are more expensive may be displayed by centrally located object displays, or alternatively objects may be presented in a row in order of price or in order of oldest to newest, for example. Entities in the supply chain such as manufacturers or brands may also pay for placement of their products in certain positions. In some circumstances it may be suitable to select the positioning of the objects randomly.

In an important variation, different classifications can be tried simultaneously. For example, a cluster of objects showcasing watches of different strap colours could be presented to the user alongside another cluster of objects showcasing watches of different prices. Other clusters of objects could also be displayed showcasing watches of a range of strap shapes, strap lengths, face types, brands, and so on. In this arrangement, each cluster is designed to allow the user to explore a particular classification and decide if one or more values or value ranges of that classification are of interest. However, the presence of multiple clusters, each for a different classification, also enables the user to glance around and easily find a classification which is useful to them for identifying watches of interest. Since different users may find different classifications more useful, this provides a powerful tool for increasing the user's options for how to explore the watches, and also for tracking which classifications are found to be more usable than others, either for individual users or across large groups of users. Based on this kind of tracking, more suitable classifications can be used, either for all users or in a way that is tailored to a particular user, to help users explore objects and other items more easily and more fruitfully. It may be suitable to show clusters for more popular classifications in more prominent positions. For display systems with large numbers of object displays 201, it is suitable to present to the user as many clusters as necessary to fill the display system.

The full list of classifications applying to a particular set of objects or a particular inventory may be derived from data relating to the objects. Once the full list of classifications is established, the maximum number of clusters can be determined, although one cluster may in some cases be displayed twice, for example for infinite scrolling or simply to populate all the object displays 102. Access control may apply to clusters in the sense that some classifications may be made unavailable to certain users.

As well as detecting user interest in certain objects, for example based on gaze input or scrolling towards a tile of interest, negative user inputs indicating dislike or a lack of interest may also be detected. For example, an absence of interest or a voice command saying "I don't like blue" may be detected and used as negative inputs. Based on these, the characteristics that are not liked or not of interest may be excluded from being presented to the user. This helps to further narrow down what the user may be interested in and promote only liked or interesting objects for being displayed.

Multi-selection may also be supported, for example to determine multiple colours that the user may be interested in, or multiple combinations of characteristics. For example, it may be determined based on user input that a user likes blue or white watch straps that are ideally inexpensive but otherwise quite expensive but not very expensive. Other combinations are detectable, such as a user that shows an interest in white expensive watch straps or blue inexpensive watch straps.

Pinning may optionally be supported in which a user may pin an object to a display by instructing the display system to keep the object displayed until it is unpinned, regardless of future selections of (i.e. expressions of interest in) other objects. The user may instruct the display system to pin an object by various input means. For example, the user may use a voice command such as 'pin this' or 'remember this for later' combined with gaze input directed at the object in question. In other examples the user may use a voice command such as 'pin the watch with the black strap' or 'unpin the watch with the number markings'.

A user profile may be built by observing and recording user behaviour and/or by building a profile of characteristics of the user such as gender, age, and location. User information may be mined from social media and other accounts of the user, providing that the user's permission to do so has been obtained. The user permission may, for example, be obtained using an opt-in/opt-out button on a touchscreen of the display system.

User behaviour such as browsing behaviour and purchasing behaviour may be used to build a profile of objects and object characteristics that the user has expressed an interest in. User interest may be received as a signal based on user input such as eye tracking or tap input directed to a particular displayed object. Scores or weights representing a level of user interest can be assigned and stored in a user profile as follows. In the following example 0.1 indicates a low level of interest and 1.0 represents a maximum level of interest.

Example

|  | Product of scores |
|---|---|
| Watch-0.9-strap-colour-blue-0.8-straplength-long-0.8 | 0.576 |
| Watch-0.9-strap-colour-blue-0.8-straplength-medium-0.4 | 0.288 |
| Watch-0.9-strap-colour-grey-0.6-straplength-long-0.8 | 0.432 |

This example represents a user who is highly interest in watches, particularly blue strap watches, preferably having long straps. Each item and its scores, for example the watch with the long, blue strap and its scores, represent a data point in the user profile. An overall score for each data point may be calculated, for example by finding the product of the individual scores.

The system may optionally store a time sequence in which the user showed interest in data points. For example, the above interest in watches may be recorded as occurring in June, while in July the same user expresses an interest in trousers.
June-watch-0.9-strap-colour-blue-0.8-straplength-long-0.8
June-watch-0.9-strap-colour-blue-0.8-straplength-medium-0.4
June-watch-0.9-strap-colour-grey-0.6-straplength-long-0.8
July-trousers-0.8

This enables the system to recognise that in July trousers that are blue or grey, or that match or coordinate with blue or grey, should be presented to the user before trying other colours. In this way the system assumes that there is a preference for blue, grey or colours that coordinate with blue or grey, whilst still allowing users to chose other colours.

More general user preferences may also be stored in the user profile. For example, if a user prefers watches in a particular price bracket, then there should be a bias towards presenting watches in that price bracket to the user.

The interface can be used not only to determine items of a particular type, such as jackets, that are of interest to a user, but also to determine different types of products that are suitable for being merchandised in conjunction with the jackets. For example, if it is determined that the user is interested in blue jackets, it may be appropriate to additionally display coordinating sports gear and accessories or coordinating trousers.

The interface may be configured for use by a merchandising buyer. If the merchandising buyer is interested in a particular jacket, then the jacket can be given a score boost of 0.2 in the merchandising buyer's profile, for example up to a maximum score of 1.0.

In other examples, the interface may be configured such that a salesperson may register their own selling preferences with the display system, so that the choice of objects, as well as the choice of which categories are explored before others, may be influenced by what the seller is best able to sell. This may be suitable if, for example, the salesperson is a specialist in a particular range of products. In this way, the display system may take into account not only the customer's behaviour and the customer's profile, but also the salesperson's preferences and expertise.

Figure 11:
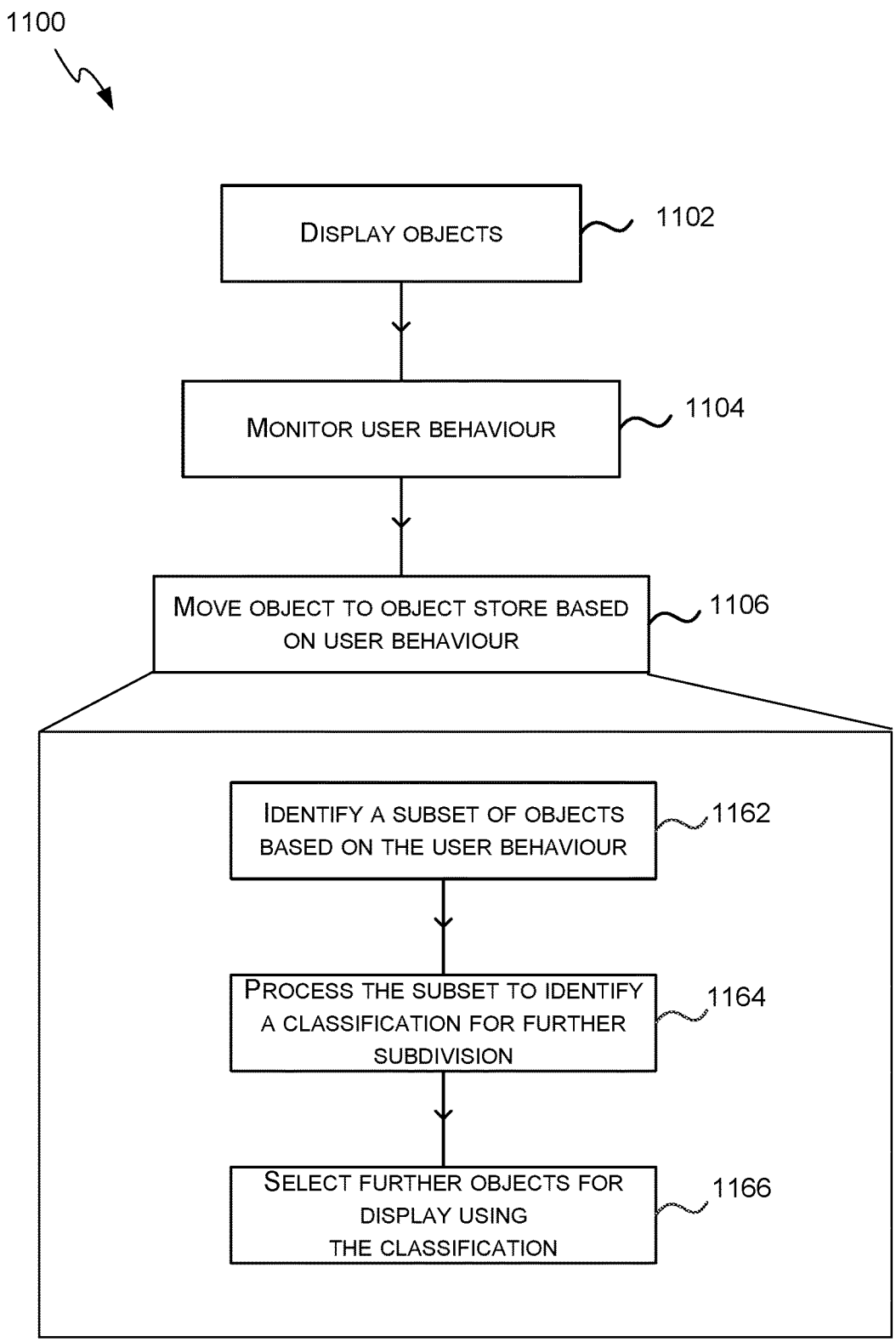
FIG. 11 is a flow chart showing a method of displaying objects to a user.

With the above disclosure in mind, a method 1100 is presented for providing an interactive physical product browsing experience. Referring to FIG. 11, the method 1100 comprises causing object displays each comprising an object store to display 1102 some objects of a plurality of objects; monitoring 1104 user behaviour using a user input receiving means; and causing a robot to move 1106 an object from a repository to one of the object stores based on the user behaviour.

As shown in FIG. 11, the step of causing a robot to move an object from a repository to one of the object stores based on the user behaviour may comprise: identifying 1162 a subset of the inventory based on the user behavior (as monitored in block 1104); automatically processing 1164 the subset of items to determine a classification for distinguishing between items of the subset; and selecting 1166 further objects for display based on the classification. As described above, the classification may be determined by scoring each of a plurality of candidate classifications based on a set of performance criteria and selecting one of the candidate classifications based on the score for each candidate classification.

The step of selecting further objects for display based on the classification (in block 1166) may, for example, comprising selecting a plurality of further objects for display, wherein each of the selected further objects corresponds to a different value or class of the selected classification. For example, if the selected classification is colour, a plurality of objects of different colours may be selected (in block 1166). Referring back to the watch examples described previously, if the selected classification is strap shape, a plurality of watches having different strap shapes may be selected.

The process of selecting objects for display may be iterative, with different classifications being selected in subsequent iterations. Referring back to the earlier watch example, in a first iteration a subset of watches with black straps may be identified based on user behavior (in block 1162) and the classification of strap shape may be selected (in block 1164) and examples of watches with different classes of strap shape may be displayed (as shown in FIG. 6). Based on user behaviour, a further subset may be identified comprising watches with black, bezel straps (in block 1162) and from this a further classification of watch face type may be identified (in block 1164) such that further watches with black, bezel straps and different watch faces may be selected for display (as shown in FIG. 9).

Figure 12:
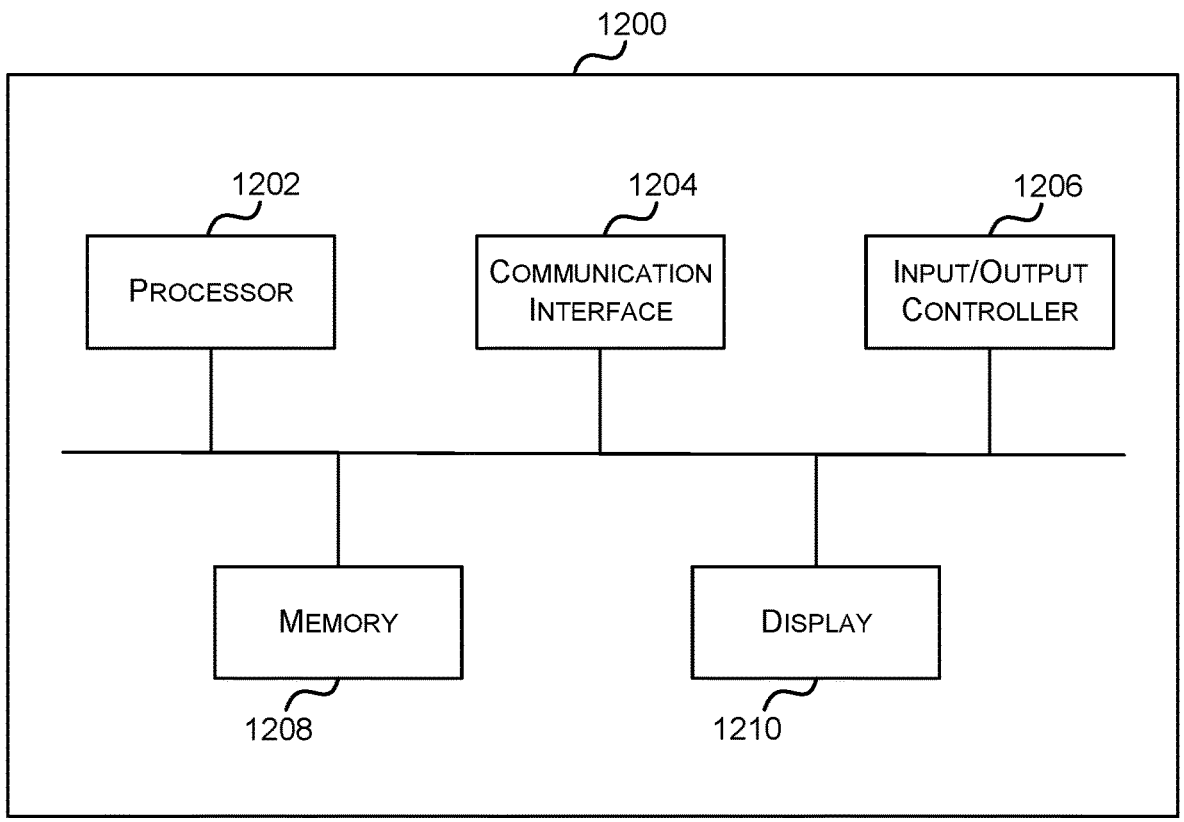
FIG. 12 is a schematic diagram of an exemplary computing device in which the method of FIG. 11 may be implemented.

A computing device 1200 suitable for implementing the method 1100 is shown in FIG. 12. The computing device 1200 comprises a processor 1202, a communication interface 1204, an input/output controller 1206, computer memory 1208, and a display 1210. The processor 1202 may be configured to implement the method 1100 using the display 1110, a user input receiving means in communication with the input/output controller 1106, and instructions stored in the memory 1108. The input/output controller 1206 may be used to interface with a robot as described above.

The present disclosure extends to a variation in which at least part of the function of the robot is performed by one or more human operators. In an implementation of the variation, the display system is configured to instruct one or more human operators to fetch certain objects from the repository and to display them by placing them in certain object stores. In another implementation of the variation, the display system is configured to instruct one or more human operators to fetch certain objects from the repository and to place them in an object cache located near the object displays to be available for the robot to move the objects from the object cache to the object stores. In this other implementation, the display system may be configured to instruct the one or more human operators to fetch relevant objects to facilitate quick scrolling. The instructions may be delivered through voice commands, text appearing on a display device (e.g. a monitor, smartphone, smartwatch, etc.) or other means.

Alternatively, or in addition, the functionality described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Computer executable instructions are provided using any computer-readable media that is accessible by a computing based device such as computing device 1100. Computer-readable media includes, for example, computer storage media such as memory and communications media. Computer storage media, such as memory, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory) is shown within the computing-based device it will be appreciated that the storage is, in some examples, distributed or located remotely and accessed via a network or other communication link (e.g. using communication interface).

The computing-based device also comprises an input/output controller arranged to output display information to a display device which may be separate from or integral to the computing-based device. The display information may provide a graphical user interface. The input/output controller is also arranged to receive and process input from one or more devices, such as a user input device (e.g. a mouse, keyboard, camera, microphone or other sensor). In some examples the user input device detects voice input, user gestures or other user actions and provides a natural user interface (NUI). In an embodiment the display device also acts as the user input device if it is a touch sensitive display device. The input/output controller outputs data to devices other than the display device in some examples, e.g. a locally connected printing device.

Any of the input/output controller, display device and the user input device may comprise NUI technology which enables a user to interact with the computing-based device in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

A first further example provides a display system for displaying objects, the display system comprising: a plurality of object displays each comprising an object store; a robot for moving objects to and from a repository; a user input receiving means; and a processing means configured to: cause the object displays to display some of the objects; monitor user behaviour using the user input receiving means; and cause the robot to move an object from the repository to one of the object stores based on the user behaviour.

The first further example may additionally comprise any combination of one or more of the following aspects:

The processing means may be configured to: identify a subset of objects in the repository based on the user behaviour; process the subset to identify a classification for further subdivision of the subset; and select objects to be displayed using the classification.

The processing means may be configured to select objects to be displayed using the classification by: selecting a plurality of objects from the subset to be displayed, wherein each of the objects in the plurality of objects belongs to a different class of the classification.

The processing means may be configured to: select objects to be displayed based on user behaviour.

The processing means may be configured to: associate a first plurality of objects with respective object displays, each of the first plurality of objects having a respective value of a first classification; cause each of the respective object displays associated with the first plurality of objects to display the object associated with it; receive from the user input receiving means a first user input indicating one of the first plurality of objects as a first object of interest, the first object of interest having a first value of the first classification; in response to receiving the first user input, associate a second plurality of objects with respective object displays, each of the second plurality of objects having a respective value of a second classification and being related to the first object of interest by having a value of the first classification within a threshold similarity of the first value; cause each of the respective object displays associated with the second plurality of objects to display the object associated with it.

The processing means may be configured to cause the object displays to display objects to enable scrolling.

The processing means may be configured to determine an object of interest based on the user behaviour.

The user behaviour may comprise gaze; and the user input receiving means may comprise a sensor for detecting the user's gaze.

The display system may further comprise: an identifying means for identifying a user, wherein the processing means is configured to use at least one signal from the identifying means to identify the user and invoke a user profile associated with the user for determining objects in the repository to be displayed.

The display system may further comprise: a camera for imaging an object presented by the user, wherein the processing means is configured to use at least one image from the camera to identify associated objects in the repository to be displayed.

Each object display may comprise a digital display device for rendering images; and the causing an object display to display an object may comprise causing the object display to render an image of the object.

The causing an object display to display an object may further comprise causing the robot to move the object from the repository to the object store of the object display.

The processing means may be configured to: detect a user command to retrieve an object from the repository; and responsive to the user command, cause the robot to move the object from the repository to the object store of the object display whose digital display device renders an image of the object.

Each object display may provide visibility of the contents of its object store; and the causing an object display to display an object comprises causing the robot to move the object from the repository to the object store of the object display.

Each object display may be configured to provide user access to an object inside its object store to enable the user to remove the object from the object store and interact with it.

Each object display may comprise sensors to identify an object returned to the object store of the object display by the user.

The processing means may be configured to cause the robot to move the identified object back to its correct place in the repository.

The processing means may be configured to detect a transaction performed by a user in relation to an object that has been displayed.

The detecting a transaction may comprise receiving a transaction complete signal identifying the object and the user from a transaction processing system.

The processing means may be configured to: detect that a user has removed an object from an object store and not returned it within a predetermined period; and responsive to detecting that the object has not been returned within the predetermined period, transmit a transaction trigger signal identifying the object and the user to a transaction processing system.

A second further example provides a method for displaying objects, the method comprising: causing object displays each comprising an object store to display some objects of a plurality of objects; monitoring user behaviour using a user input receiving means; and causing a robot to move an object from a repository to one of the object stores based on the user behaviour.

A third further aspect provides a means for displaying objects, the means providing: a plurality of object displays each comprising an object store; a robot for moving objects to and from a repository; a user input receiving means; and a processing means configured to: cause the object displays to display some of the objects; monitor user behaviour using the user input receiving means; and cause the robot to move an object from the repository to one of the object stores based on the user behaviour.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language)

software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. A display system for displaying objects, the display system comprising:
    a plurality of object displays each corresponding to an object store from a plurality of object stores;
    a robot for moving physical objects to and from a repository;
    a user input receiving means; and
    a processor programmed to:
        receive a request for a physical object;
        cause the robot to move the physical object from the repository to one of the plurality of object stores based on the received request;
        receive an indication that the robot has placed the physical object in the one of the plurality of object stores; and
        based on the received indication, display, on one of the plurality of object displays, a live view of contents of the one of the plurality of object stores, the contents comprising the physical object from the repository.

2. The display system of claim 1, wherein the processor is further programmed to:
    identify a subset of physical objects in the repository based on a user behaviour;
    process the subset to identify a classification for further subdivision of the subset; and
    select physical objects to be displayed using the classification.

3. The display system of claim 2, wherein the processor is further programmed to select physical objects to be displayed using the classification by:
    selecting a plurality of physical objects from the subset to be displayed, wherein each of the physical objects in the plurality of physical objects belongs to a different class of the classification.

4. The display system of claim 1, wherein the one of the plurality of object stores is a compartment.

5. The display system of claim 1, wherein the processor is further programmed to determine an object of interest based on a user behaviour.

6. The display system of claim 1, wherein:
    a user behaviour comprises a gaze; and
    the user input receiving means comprises a sensor for detecting the user's gaze.

7. The display system of claim 1, further comprising:
    an identifying means for identifying a user, wherein the processor is further programmed to use at least one signal from the identifying means to identify the user and invoke a user profile associated with the user for determining physical objects in the repository to be displayed.

8. The display system of claim 1, further comprising:
    a camera for imaging a physical object presented by a user, wherein the processor is further programmed to use at least one image from the camera to identify associated physical objects in the repository to be displayed.

9. The display system of claim 1, wherein:
    each object display comprises a digital display device for rendering images; and
    causing the one of the plurality of object displays to display the physical object comprises causing the object display to render an image of the physical object.

10. The display system of claim 9, wherein:
    causing the one of the plurality of object displays to display the physical object further comprises causing the robot to move the physical object from the repository to the object store of the one of the plurality of object displays.

11. The display system of claim 9, wherein the processor is further programmed to:
    detect a user command to retrieve the physical object from the repository; and
    responsive to the user command, cause the robot to move the physical object from the repository to the object store of the one of the plurality of object displays whose digital display device renders an image of the physical object.

12. The display system of claim 1, wherein the display of the physical object in the object store is based on a user requesting to view the contents: and wherein the processor is further programmed to:
upon the user request, enable the robot to access the physical object from the object store; and
provide the physical object to the user.

13. The display system of claim 1, wherein each object display is configured to provide user access to a physical object inside its object store to enable the user to remove the physical object from the object store and interact with it.

14. The display system of claim 13, wherein each object display comprises sensors to identify a physical object returned to the object store of the one of the plurality of object displays by the user.

15. The display system of claim 14, wherein the processor is further programmed to cause the robot to move the identified physical object back to its correct place in the repository.

16. The display system of claim 13, wherein the processor is further programmed to:
detect that a user has removed the physical object from the one of the plurality of object stores and not returned it within a predetermined period; and
responsive to detecting that the physical object has not been returned within the predetermined period, transmit a transaction trigger signal identifying the physical object and the user to a transaction processing system.

17. The display system of claim 1, wherein the processor is further programmed to detect a transaction performed by a user in relation to the physical object.

18. The display system of claim 17, wherein the detecting a transaction comprises receiving a transaction complete signal identifying the physical object and the user from a transaction processing system.

19. A method for displaying objects, the method comprising:
receive a request for a physical object;
causing a robot to move the physical object from a repository to one of a plurality of object stores based on the received request;
receiving an indication that the robot has placed the physical object in the one of the plurality of object stores; and
based on the received indication, display, on one of the plurality of object displays, a live view of contents of the one of the plurality of object stores, the contents comprising the physical object requested from a user.

20. A means for displaying objects, the means providing:
a plurality of object displays each corresponding to an object store;
a robot for moving physical objects to and from a repository;
a user input receiving means; and
a processing means configured to:
cause the robot to move a physical object from the repository to one of the plurality of object stores based on a request from a user;
receive an indication that the robot has placed the physical object in the one of the plurality of object stores; and
based on the received indication, display, on one of the plurality of object displays, a live view of contents of the one of the plurality of object stores, the contents comprising the physical object requested from the user.

* * * * *